(12) United States Patent
Douglas et al.

(10) Patent No.: US 11,122,546 B2
(45) Date of Patent: Sep. 14, 2021

(54) MULTIPLE NETWORK CONNECTIONS TO INCREASE DATA THROUGHPUT OF MOBILE DEVICE

(71) Applicant: Capital One Services, LLC, McLean, VA (US)

(72) Inventors: Lawrence H. Douglas, McLean, VA (US); Clayton Johnson, Edgewood, MD (US)

(73) Assignee: Capital One Services, LLC, McLean, VA (US)

( * ) Notice: Subject to any disclaimer, the term of this patent is extended or adjusted under 35 U.S.C. 154(b) by 84 days.

(21) Appl. No.: 16/695,740

(22) Filed: Nov. 26, 2019

(65) Prior Publication Data
US 2020/0100218 A1 Mar. 26, 2020

Related U.S. Application Data

(62) Division of application No. 16/128,759, filed on Sep. 12, 2018, now Pat. No. 10,531,436.

(51) Int. Cl.
*H04W 72/04* (2009.01)
*H04W 76/10* (2018.01)
(Continued)

(52) U.S. Cl.
CPC .......... *H04W 72/04* (2013.01); *H04W 76/10* (2018.02); *H04W 4/80* (2018.02); *H04W 84/12* (2013.01)

(58) Field of Classification Search
None
See application file for complete search history.

(56) References Cited

U.S. PATENT DOCUMENTS 9,762,702 B2 9/2017 Biswas
2003/0204634 A1 10/2003 Pinkerton et al.
(Continued)

OTHER PUBLICATIONS

Park, et al., "Disjointed Multipath Routing for Real-Time Data in Wireless Multimedia Sensor Networks", Hindawi Publishing Corporation, International Journal of Distributed Sensor Networks, vol. 2014, Article ID 783697, http://dx.doi.org/10.1155/2014/783697, Published date Jan. 16, 2014, 8 pages.
(Continued)

*Primary Examiner* — Brian S Roberts
(74) *Attorney, Agent, or Firm* — DLA Piper LLP (US)

(57) ABSTRACT

In one aspect, the present disclosure relates to a method for method for efficient allocation of bandwidth in a wireless network. The method can include: identifying a plurality of network interfaces on a first user device; initializing a virtual network resource associated with the plurality of network interfaces; receiving, at the virtual network resource, data packets from an app executing on the first user device, the data packets destined for a remote device; sending a first portion of the data packets to the remote device via a first one of the plurality of network interfaces; and sending a second portion of the data packets to the remote device via a second one of the plurality of network interfaces. An aggregation platform can be configured to receive and reconstitute the first and second portions of the data packets, and to transmit the reconstituted data packets to the remote device.

20 Claims, 6 Drawing Sheets

(51) Int. Cl.
*H04W 84/12* (2009.01)
*H04W 4/80* (2018.01)

(56) References Cited

U.S. PATENT DOCUMENTS

| | | |
|---|---|---|
| 2004/0264379 A1 | 12/2004 | Srikrishna et al. |
| 2008/0075010 A1 | 3/2008 | Song |
| 2009/0073921 A1 | 3/2009 | Ji et al. |
| 2011/0235578 A1 | 9/2011 | Laganier et al. |
| 2011/0296006 A1 | 12/2011 | Krishnaswamy et al. |
| 2012/0020248 A1 | 1/2012 | Granlund et al. |
| 2012/0093150 A1 | 4/2012 | Kini |
| 2012/0226802 A1 | 9/2012 | Wu et al. |
| 2013/0171964 A1* | 7/2013 | Bhatia ............... H04W 12/08 455/411 |
| 2014/0254499 A1* | 9/2014 | Hassan ............... H04W 48/18 370/329 |
| 2014/0293959 A1 | 10/2014 | Singh et al. |
| 2015/0011179 A1* | 1/2015 | Won ............... H04W 4/80 455/405 |
| 2015/0189024 A1* | 7/2015 | Misra ............... H04M 15/07 709/205 |
| 2015/0295782 A1 | 10/2015 | Ramamoorthy et al. |
| 2015/0319270 A1 | 11/2015 | Roeland et al. |
| 2016/0360410 A1* | 12/2016 | Obaidi ............... H04W 76/15 |
| 2017/0141932 A1* | 5/2017 | Tang ............... H04W 76/14 |
| 2017/0188407 A1 | 6/2017 | Zee et al. |
| 2017/0339257 A1 | 11/2017 | Kanagarathinam et al. |

OTHER PUBLICATIONS

Tsai, et al., "A Review of Multipath Routing Protocols: From Wireless Ad Hoc to Mesh Networks", National ICT Australia (NICTA) / University of New South Wales, Australia, printed Sep. 6, 2018, 6 pages.

* cited by examiner

MULTIPLE NETWORK CONNECTIONS TO INCREASE DATA THROUGHPUT OF MOBILE DEVICE

CROSS-REFERENCE TO RELATED APPLICATION INFORMATION

This is a divisional of U.S. patent application Ser. No. 16/128,759, filed Sep. 12, 2018, which is incorporated herein by reference in its entirety.

BACKGROUND

Telecommunications networks may be arranged in a physical or logical hierarchy having a core (or "backbone") network, one or more edge networks, and a backhaul portion that includes intermediate links between the core and edge networks. The edge networks may include cellular ("cell") towers to which smartphones, tablets, and other mobile devices can wirelessly connect. In existing networks, a user device may transmit data packets to a remote device or network via a single network data path. For example, when a user initiates a call, their voice data may be routed to a nearby cell tower and then to a core network via a single backhaul connection. As another example, a user device may send and receive data packets to a server device via a single data path in a wireless network. Many user devices are equipped with multiple wireless network adapters, such as Wi-Fi, Bluetooth, and cellular (e.g., LTE) adapters.

SUMMARY

According to one aspect of the present disclosure, a method for efficient allocation of bandwidth in a wireless network may include: identifying a plurality of network interfaces on a first user device; initializing a virtual network resource associated with the plurality of network interfaces; receiving, at the virtual network resource, data packets from an app executing on the first user device, the data packets destined for a remote device; sending a first portion of the data packets to the remote device via a first one of the plurality of network interfaces; and sending a second portion of the data packets to the remote device via a second one of the plurality of network interfaces. The aggregation platform can be configured to receive and reconstitute the first and second portions of the data packets, and to transmit the reconstituted data packets to the remote device.

In some embodiments, the plurality of network interfaces includes a Bluetooth interface, a Wi-Fi interface, and a cellular interface. In some embodiments, the method can include establishing a wireless network connection to a second user device, wherein sending the first portion of the data packets to the remote device via a first one of the plurality of network interfaces comprises sending the first portion of the data packets to the remote device via the wireless network connection established with the second user device. In some embodiments, establishing a wireless network connection to the second user device may include establishing a Bluetooth connection to the second user device. In some embodiments, the virtual network resource can be initialized as a virtual network interface of the first user device. In some embodiments, the app executing on the first user device may explicitly sends the data packets to the virtual network interface. In some embodiments, the virtual network interface may intercept the data packets sent from the app executing on the first user device. In some embodiments, the wireless network can be associated with a cellular carrier network, wherein the aggregation platform is provided within a core network of the cellular carrier network. In some embodiments, the method may include encrypting, by the virtual network resource, the first and second portions of the data packets.

According to another aspect of the present disclosure, a method for efficient allocation of bandwidth in a wireless network can include: receiving, at a first user device, a request to share bandwidth with a second user device; in response to a user of the first user device approving the request to share bandwidth with the second user device, establishing a peer-to-peer network between the first user device and the second user device, the peer-to-peer network associated with a first network interface of the first user device; receiving, via the first network interface of the first user device, first data packets transmitted by the second user device, the first data packets destined for a remote device; and transmitting, via a second network interface of the first user device, the first data packets to the remote device.

In some embodiments, the peer-to-peer network may be a Bluetooth network. In some embodiments, the peer-to-peer network can be a Wi-Fi direct network. In some embodiments, the method may include: prompting the user of the first user device to select a percentage of the bandwidth to share with the second user device; and throttling the transmitting of the first data packets to the core network based on the selected percentage of bandwidth to share. In some embodiments, the method may include: receiving, at the first user device, a request to share bandwidth with a third user device; and, in response to determining the third user device is identified by a whitelist stored on the first user device, establishing a second wireless network connection between the first user device and the third user device. In some embodiments, the method may include: receiving, at the first user device, a request to share bandwidth with a third user device; and in response to determining the third user device is identified by a blacklist stored on the first user device, refusing the request to share bandwidth with the third user device. In some embodiments, the method may include sending a micropayment from the second user device to the first user device in exchange for sharing bandwidth. In some embodiments, an amount of the micropayment may be based on an actual amount of bandwidth shared between the first and second user devices. In some embodiments, the second user device can include a virtual network resource configured to encrypt the first data packets.

According to another aspect of the present disclosure, a system for efficient allocation of bandwidth in a wireless network may include: a processor; a plurality of apps configured to execute on the processor; a plurality of network interfaces; and a virtual network resource operatively coupled to the plurality of apps and the plurality of network interfaces. The virtual network resource may be configured to: receive data packets from a first one of the plurality of apps; send a first portion of the data packets to a core network via a first one of the plurality of network interfaces; and send a second portion of the data packets to the core network via a second one of the plurality of network interfaces. An aggregation platform in the core network may be configured to combine the first and second portions of the data packets.

BRIEF DESCRIPTION OF THE DRAWINGS

Various objectives, features, and advantages of the disclosed subject matter can be more fully appreciated with reference to the following detailed description of the dis

The drawings are not necessarily to scale, or inclusive of all elements of a system, emphasis instead generally being placed upon illustrating the concepts, structures, and techniques sought to be protected herein.

DETAILED DESCRIPTION

In some embodiments, the present disclosure relates to systems and methods for increasing the effective wireless data throughput of a user device by using multiple network connections. A user device may have a plurality of wireless network interfaces or adapters, such as a Bluetooth adapter, an LTE or other type of cellular adapter, and one or more Wi-Fi adapters. The user device can create a "virtual" network resource that is linked to or otherwise associated with multiple network interfaces. Applications (or "apps") running on the device can utilize the virtual network resource to send/receive data to/from a remote device, such as a server device. Data packets from a single app or session may be split into multiple streams ("packet streams") and routed along multiple different network paths in a simultaneous or concurrent manner. For example, a user device may route data packets over both Wi-Fi and Bluetooth at the same time. In addition to improving data throughput, embodiments of the present disclosure can improve security in a wireless communications network because an attacker would need to eavesdrop multiple wireless channels in order to receive all data transferred by an app.

In some embodiments, an aggregation platform may be provided to reconstitute the multiple packet streams back into a single stream or collection of data packets and to forward the reconstituted data to the intended destination (e.g., to a server device). In some embodiments, wherein the user device may be part of a telecommunications network that includes a core network and one or more edge networks, the aggregation platform may be located within the core network.

In some embodiments, the present disclosure relates to systems and methods for sharing wireless network bandwidth across multiple user devices. A first user device can share its network bandwidth with a second user device by establishing a Bluetooth connection or other type of peer-to-peer connection between the devices. A management app running on a first user device can manage which peer users or devices are allowed to share its bandwidth. In some embodiments, the app can allow payments to be remitted in exchange for shared bandwidth. The present disclosure can improve the efficiency of a wireless communications network by dynamically redistributing bandwidth from devices with excess bandwidth to devices with insufficient bandwidth.

Figure 1:
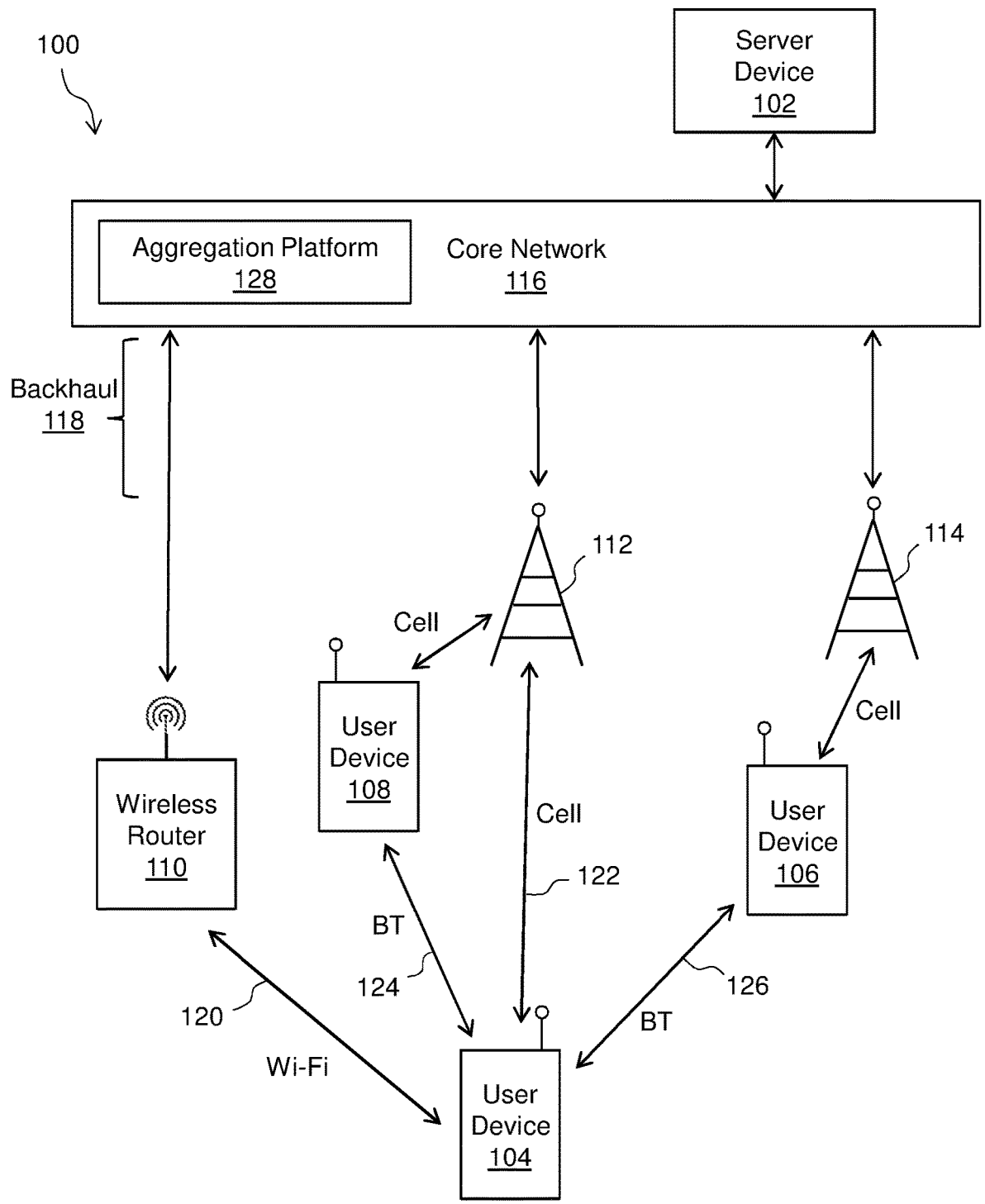
- FIG. 1 is a diagram of an illustrative telecommunications network, according to some embodiments of the present disclosure.

FIG. 1 shows an illustrative telecommunications network 100, according to some embodiments of the present disclosure. The network 100 can include a plurality of nodes through which data packets can be routed or transferred. Each node may include hardware and/or software for receiving, processing, and/or transmitting data packets. In the example of FIG. 1, the network nodes can include a server device 102, a first user device 104, a second user device 106, a third user device 108, a wireless router (e.g., Wi-Fi router) 110, a first cell tower 112, and a second cell tower 114. The network 100 can also include a core network 116. The cell towers 112, 114 and/or wireless router 110 may be coupled to the core network 116 via a backhaul network 118. The server device 102 may be coupled to the core network via one or more wired or wireless network links. In some embodiments, cell towers 112 and 114, core network 116, and backhaul network 118 may form a portion of a telecommunications network, such as a cellular carrier network.

While the illustrative network 100 is shown having three (3) user devices 104, 106, 108, one wireless router 110, and two cell towers 112, 114, a skilled artisan will appreciate that systems and methods described herein may be applied to wireless networks having an arbitrary number of user devices, server devices, routers, cell towers, and other types of nodes.

User devices 102, 104, 106 can include smartphones, tablets, or other mobile devices. Each user device 104, 106, 108 may include one or more wireless network interfaces or adapters, such as a Bluetooth adapter, an LTE or other type of cellular adapter, and one or more Wi-Fi adapters. One or more of the user devices 104, 106, 108 may include software and/or hardware configured to create and utilize a "virtual" network resource that is linked to or otherwise associated with multiple network interfaces on the device. In some embodiments, the capability to create and use a virtual network resource may be provided by an operating system (OS)-level resource installed on the device, for example as an OS extension or driver. The virtual network resource may be created as a separate network interface on the device that can be accessed by apps in the same manner apps can access a Wi-Fi, cellular, or Bluetooth network interface. The virtual network resource can route packets via different network connections (e.g., multiple Bluetooth, multiple Wi-Fi, LTE) using known network protocols (e.g., HTTPS). Apps running on a user device can use the virtual network resource to seamlessly send/receive data to/from a remote device, such as server device 102, via multiple network data paths. All packets can be routed to the remote device, which can reassembly or reconstitute the data.

Internally, the virtual network resource can manage and utilize wireless connections to other nodes in the network 100 using the wireless network interfaces associated with the virtual network resource. For example, as shown in FIG. 1, first user device 104 can create or initialize a virtual network resource associated with a Wi-Fi, a Bluetooth, and a cellular network interfaces. The virtual network resource of user device 104 can automatically establish wireless connections with nearby nodes including, for example, a Wi-Fi connection 120 to wireless router 110, a cellular connection 122 to first cell tower 112, a first Bluetooth connection 124 to peer user device 108, and a second Bluetooth connection 126 to peer device 106. In some embodiments, device 104 may prompt the user for information needed to establish a particular wireless connection. For example, user device 104 may prompt the user for a password or other Wi-Fi settings needed to connect to wireless router 110. As another example, user device 104 may display a code or other information needed to pair with peer devices 108, 106 via Bluetooth. A skilled artisan will understand that the number and type of wireless connections established by a particular user device may vary from the examples provided herein and depend in part on the device's available hardware and/or software resources.

Referring to the example in FIG. 1, third user device 108 may also be connected to the first cell tower 112, whereas second user device 106 may be connected to the second cell tower 114. Thus, as illustrated in FIG. 1, there can be multiple network paths between first user device 104 and server device 102. Apps running on the first user device 104 can use the virtual network resource send and receive data to and from server device 102. The virtual network resource can separate the app's data packets into multiple packet streams and transmit each packet stream via an designated network interface. For example, the virtual network resource of first user device 104 may transmit some packets to the server device 102 via Wi-Fi connection 120 and, at or about the same time, transmit other packets via the cellular connection 122. The packets may be part of a single data transmission session (e.g., a TCP session).

In some embodiments, a user device's virtual network resource can determine a quality metric for each of its associated wireless connections, and route packets over those connections with relatively high quality metrics in order to reduce congestion and bottlenecking in the network. A wireless connection's quality metric may be based, for example, on observed throughput of the connection, observed latency of the connection, and/or measured signal-to-noise ratio (SNR) of the connection. For example, referring to FIG. 1, user device 104 may calculate a quality metric for each of its connections 120, 124, 122, and 126 and then select one of more connections with the highest quality ratings and transmit packets across each of those selected connections at the same time. Intermediate routers and nodes in the network can likewise route packets through the network in a manner that seeks to reduce congestion and minimize bottlenecks. Thus, the throughput of both the transmitting user device's data paths, as well as the downstream paths can be considered so as to optimize data transmission through the network 100.

In some embodiments, a user device may function as a Wi-Fi hotspot to which one or more other user devices may connect. For example, referring to FIG. 1, first user device 104 may function as a Wi-Fi hotspot to which second and third user devices 106, 108 can connect. In this way, a user device can simultaneously obtain bandwidth from (or share bandwidth with) multiple other user devices via Wi-Fi. It some embodiments, a user device may determine the quality of network connectivity for each user device connected to its Wi-Fi hotspot, for example using peer-to-peer data transfers. This information can be used to determine which of those user devices (if any) it should route data through, while avoiding or planning around downstream bottlenecks. For example, if first user device 104 has WiFi connectivity with both second and third user devices 106, 108, but both of those user devices have relatively poor downstream connectivity, then the first user device 104 may choose to use a different wireless connection instead, such as cellular connection 122.

In some embodiments, the network 100 can include an aggregation platform 128. In the embodiment of FIG. 1, the aggregation platform 128 may be part of the core network 116. In some embodiments, aggregation platform 128 may be part of a server device (e.g., server device 102). In some embodiments, aggregation platform 128 can be separated from both the core network 116 and the server device 102. Aggregation platform 128 can include hardware and/or software configured to receive data packets transmitted by a user device via one or more network paths. In some embodiments, aggregation platform 128 can identify and collect data packets transmitted by a particular user device (e.g., first user device 104) or by a particular app running thereon. Aggregation platform 128 may store received packets in volatile or non-volatile computer memory. In some embodiments, aggregation platform 128 identifies and collects packets that are part of the same network session, such as part of the same Transmission Control Protocol (TCP) session. Aggregation platform 128 can reconstitute streams of packets received from multiple different network paths, and then forward the reconstituted data to the intended destination (e.g., server device 102). In some embodiments, the data packets when received from the senders device will reconstituted based upon a known standard, such as TCP/IP which dictates the data sent will be received in the order that it was transmitted.

It will be appreciated that, by transmitting data across multiple network paths in a simultaneous manner, the effective throughput of user devices can be increased and network bottlenecks can be reduced (and ideally minimized). In addition, the described embodiments provide improved network security by making it more difficult for an eavesdropper to intercept user data.

In some embodiments, user devices within a wireless network may be configured to install and run a management app for sharing bandwidth with peer devices. The management app allows users to participate in decentralized "bandwidth marketplace." For example, referring to FIG. 1, a user of first user device 104 ("first user") may use the management app to generate a request for bandwidth, i.e. an offer to purchase bandwidth from other users. The request may be transmitted to peer user devices that also have the management app installed, such as user devices 106 and 108 in the example of FIG. 1. The app may display a notification to users of the other devices asking if they would like to share or sell bandwidth to the requesting user/device. The app can provide controls allowing a user select which other users/devices to share bandwidth with. For example, a user of second user device 106 ("second user") can choose to share/sell bandwidth with first user 104. In addition, the management app may provide controls for selecting the amount of bandwidth to share with a particular peer user/device. For example, first user 104 could choose to share X Mb/s or Y % of their available bandwidth, where X and Y are user configurable parameters. In some embodiments, the app includes a whitelist and/or blacklist feature, allow a user to automatically allow or deny bandwidth sharing with specific users/devices.

In some embodiments, bandwidth sharing is achieved using a peer-to-peer Bluetooth networking between user devices. For example, referring to FIG. 1, a Bluetooth connection 126 and peer-to-peer network can be established between first user device 104 and second user device 106. In some embodiments, the management app running on each of the user devices 104, 106 automatically establishes a Bluetooth connection and network when the devices are within range of each other (it will be understood that the maximum range of a Bluetooth connection can vary depending on the Bluetooth version used by each of the user devices as well as other device parameters). In some embodiments, the management app automatically connects to a peer device if the peer device or an associated user is included in a device/user whitelist. After a peer-to-peer connection 126 is established, apps running on first user device 104 can take advantage of second user devices bandwidth by routing data packets through the second user device 106. For example, if an app on first user device 104 generates data packets destined for server device 102, the packets may be routed through second user device 106, second cell tower 114, core network 116, and then to server device 102. In some embodiments, a virtual network resource on first user device 104 can manage establishing and routing packets in a peer-to-peer network, as well as through other wireless connections (e.g., Wi-Fi connection 120 and cellular connection 122). In some embodiments, the management app can allow users to send and receive payments in exchange for shared bandwidth. Payments may include one or more micropayments and can be based on the actual amount of bandwidth used.

A skilled artisan will understand that, although bandwidth sharing is described herein using Bluetooth network, it could also be implemented using other peer-to-peer networking standards and protocols, such as Wi-Fi direct. It will be appreciated that the present disclosure can improve the efficiency of a wireless communications network by dynamically redistributing bandwidth from devices with excess bandwidth to devices with insufficient bandwidth.

In some embodiments, the management app or virtual network resource may encrypt all transmitted data packets so that the packets can be securely routed through untrusted devices (e.g., peer user devices) within the network 100. The packets may be decrypted by the aggregation platform 128 or at the destination (e.g., at server device 102).

Figure 2:
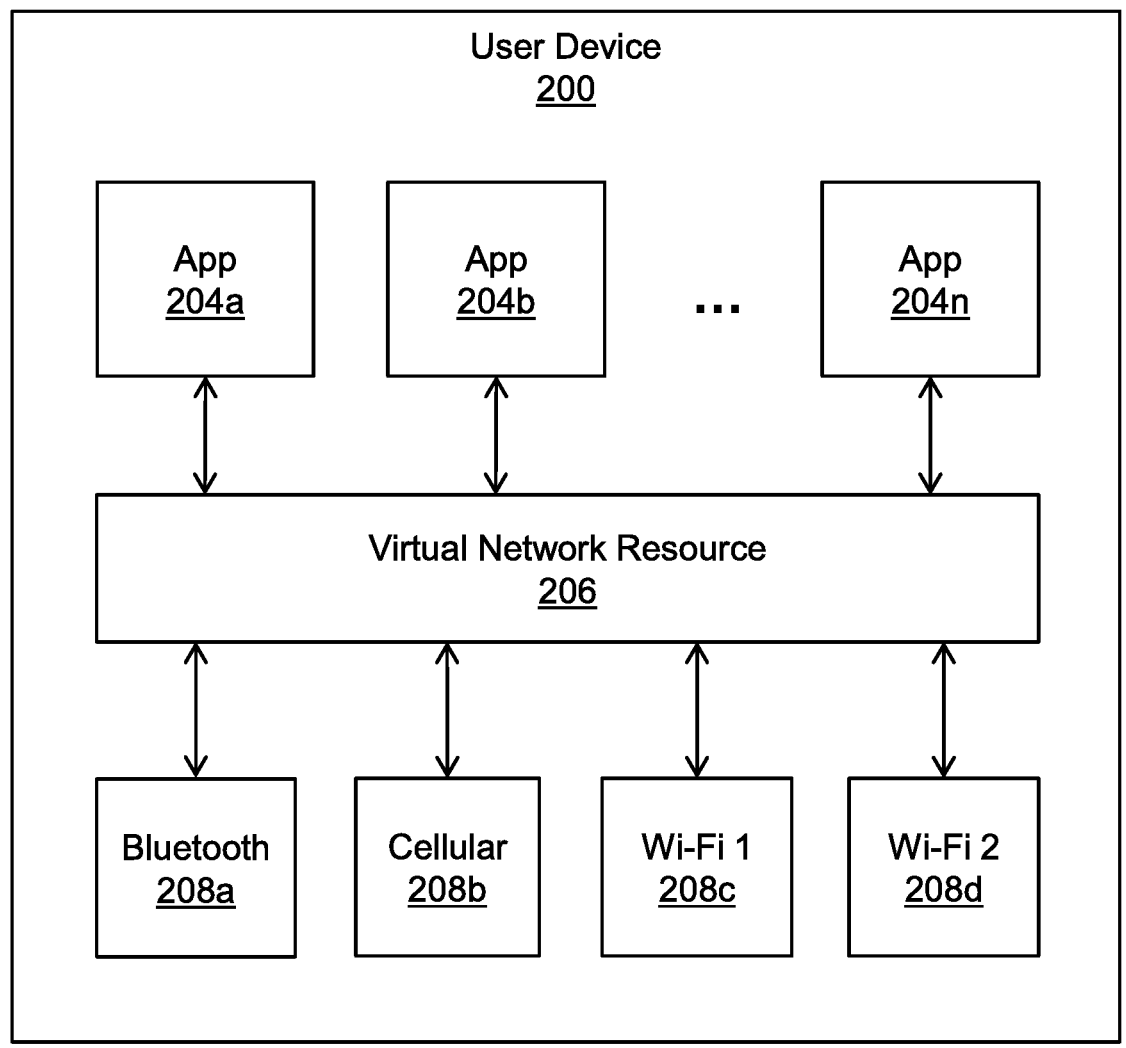
FIG. 2 is a block diagram of an illustrative user device that may form part of the network of FIG. 1, according to some embodiments of the present disclosure.

FIG. 2 shows an illustrative user device 200 that may be the same as or similar to a user device 104, 106, or 108 in FIG. 1. The illustrative user device can include a plurality of apps 204a, 204b, . . . , 204n (204 generally), a virtual network resource 206, and a plurality of network interfaces 208a, 208b, etc. (208 generally). In the example of FIG. 1, user device 200 can include a Bluetooth interface 208a, a cellular interface 208b, a first Wi-Fi interface 208c, and a second Wi-Fi interface 208d. The various components of the device 200 may be connected as shown in FIG. 2 or in any other suitable manner. Each of the device components may be provided as a hardware, software, or a combination thereof.

Apps 204 may correspond to any user- or system-level applications that send and receive data in a wireless network including but not limited to messaging apps, telephony apps, social networking apps, media apps, banking apps, mapping apps, etc. An app 204 can generate data packets that are received by the virtual network resource 206. The virtual network resource 206 can split the packets into multiple packet streams and transmit the packet streams into the network via designated network interfaces 208. Other features and embodiments of the virtual network resource 206 are discussed in conjunction with FIG. 1.

In some embodiments, an app 204 may correspond to a bandwidth-sharing management app such as discussed above in conjunction with FIG. 1. The management app may interact with the virtual network resource 206 to route data packets received from peer user devices through a wireless network. For example, data packets sent from a peer device may be received by the virtual network resource 206 via Bluetooth interface 208a. The virtual network resource 206 may check with the management app 204 to determine if the peer device is allowed to share bandwidth and/or how much bandwidth to share with the peer device. The virtual network resource 206 can forward or re-route the peer data packets through the wireless network using, for example, the cellular network interface 208b.

Figure 3:
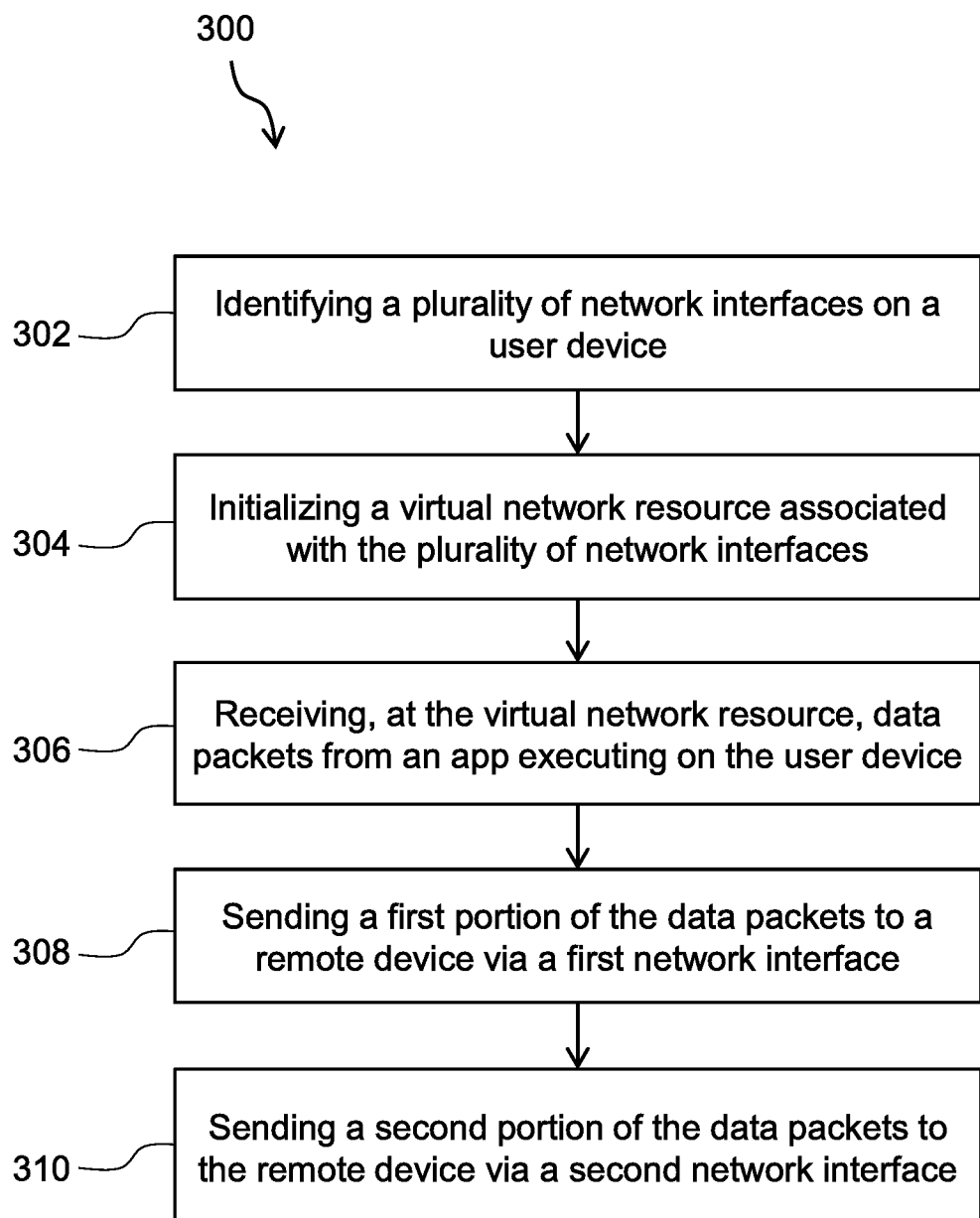
FIGS. 3 and 4 are flow diagrams showing processing that may occur within the user device of FIG. 2, according to some embodiments of the present disclosure.

Referring to FIG. 3, an illustrative method 300 may be implemented within a user device (e.g., user device 200 of FIG. 2), according to some embodiments of the present disclosure. In some embodiments, at least a portion of method 300 can be implemented within a virtual network resource, such as virtual network resource 206 of FIG. 2.

At block 302, a plurality of network interfaces may be identified on the user device. For example, referring to FIG. 2, a resource manager or other operating system component of user device 200 can be queried to identify network interfaces 208a-208d. At block 304, a virtual network resource can be initialized and associated with the identified network interfaces. For example, referring to FIG. 2, virtual network resource 206 can be created or otherwise instantiated and associated with network interfaces 208. In some embodiments, the virtual network resource may be created/initialized by the user device's operating system. The virtual network resource may be created as a separate network interface on the device which is visible to apps and/or users alongside "real" network interfaces. In some embodiments, the virtual network interface may be created/initialized by a management app running on the user device and may only be visible or accessible within that app.

At block 306, an app running on the user device may generate data packets destined for a remote device and the data packets may be received by the virtual network resource. In some embodiments, the app may explicitly transmit the data packets using the virtual network resource, for example, by selecting and writing data to the virtual network interface using standard networking system calls. In other embodiments, the virtual network resource may transparently intercept data packets sent by the app using, for example, by "hooking" into one or more networking system calls. At block 308, the data packets may be split into multiple packet streams (or "portions"). A first portion of the packets may be sent to the remote device via a first one of the identified network interface. At block 310, a second portion of the packets may be sent to the remote device via a second one of the identified network interfaces. As discussed above in conjunction with FIG. 1, an aggregation platform (e.g., platform 128 in FIG. 1) may be provided in the network reconstitute the app's data packets before they are delivered to the remote device (e.g., server device 102 in FIG. 1).

Figure 4:
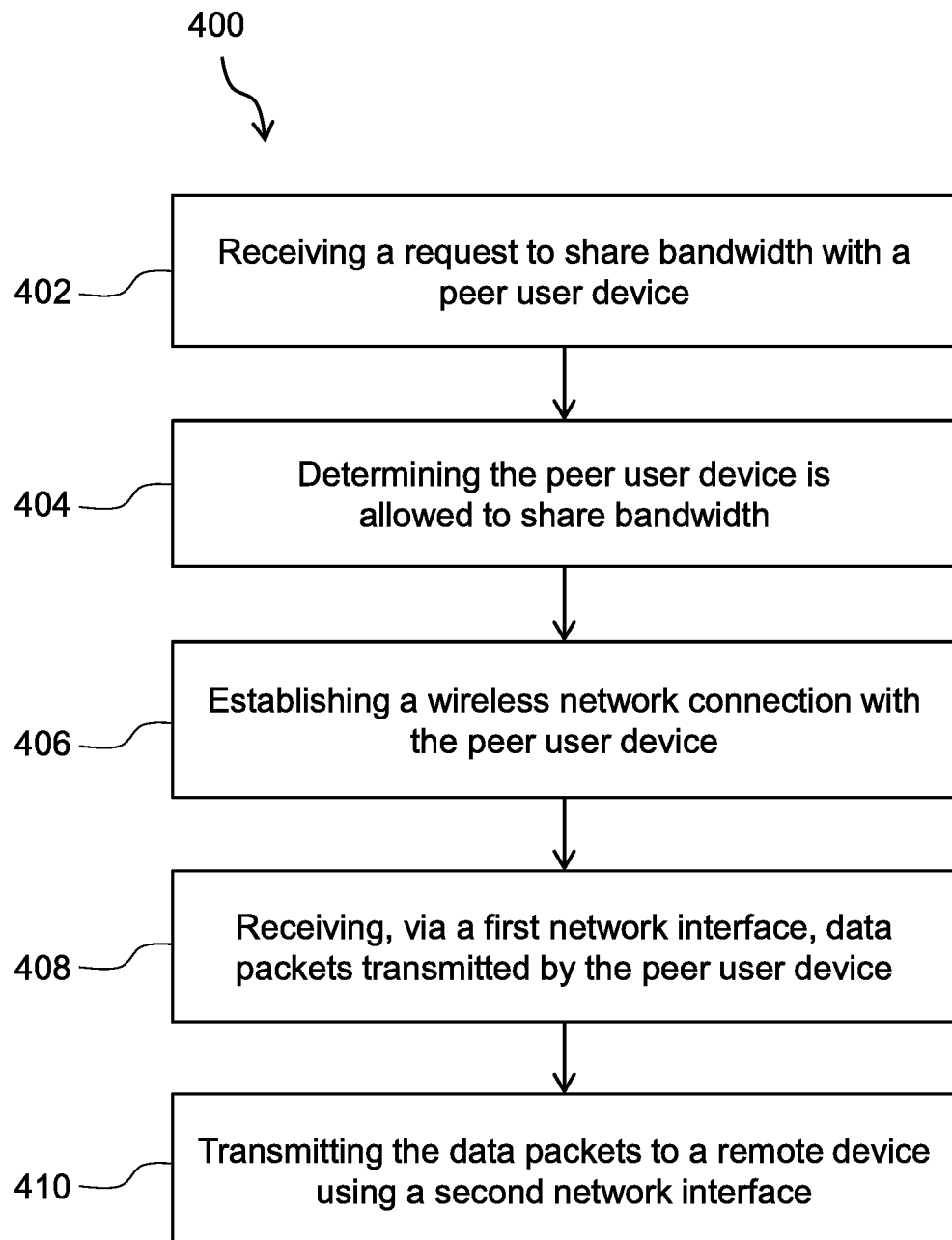

Referring to FIG. 4, an illustrative method 400 may be implemented within a user device (e.g., user device 200 of FIG. 2), according to some embodiments of the present disclosure. In some embodiments, the method 400 may be implemented within a management app (e.g., an app 204 of FIG. 2) and/or a virtual network resource installed on the user device (e.g., virtual network resource 206 of FIG. 2).

At block 402, a request may be received at a first user device to share bandwidth with a peer or "second" user device. The request may be sent by a management app running on the second device, and received by a management app running on the first device. At block 404, a determination can be made as to whether the second device is allowed to share bandwidth with the first device. In some embodiments, a notification may be displayed on the first device and a user can choose to allow the second device to share bandwidth or reject the request. In some embodiments, the user can select the amount of bandwidth to share with the second device. In some embodiments, a whitelist may be used to determine that the second device is allowed to share the first device's bandwidth.

At block 406, a wireless network connection may be established between the first and second devices. The wireless network connection may be associated with a first network interface on the first device, such as a Bluetooth interface. In some embodiments, a peer-to-peer Bluetooth network may be established between the devices. In some embodiments, the management app running on the first and/or second user device can automatically establishes a Bluetooth network when the devices are within range of each other.

At block 408, the first device may receive data packets transmitted by the second device via a first network interface. At block 410, the data packets may be transmitted to a remote device via a second network interface, such as a cellular or Wi-Fi interface. In some embodiments, a virtual network resource on the first device may split the received data packets into multiple packet streams, and route the streams over multiple network paths to the remote device.

Figure 5:
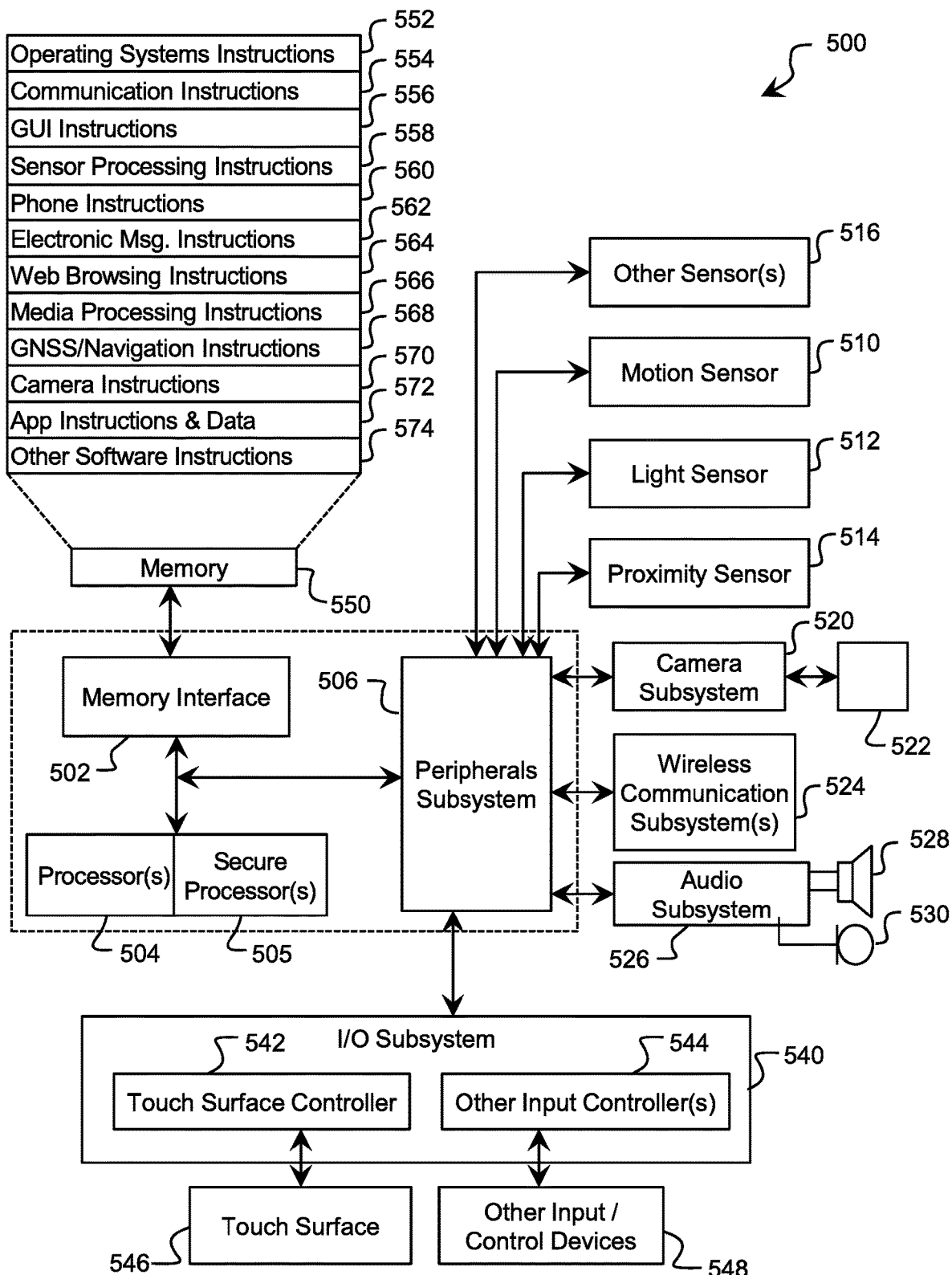
FIG. 5 is a block diagram of another illustrative user device, according to some embodiments of the present disclosure.

FIG. 5 shows a user device 500, according to an embodiment of the present disclosure. The illustrative user device 500 may include a memory interface 502, one or more data processors, image processors, central processing units 504, and/or secure processing units 505, and a peripherals interface 506. The memory interface 502, the one or more processors 504 and/or secure processors 505, and/or the peripherals interface 506 may be separate components or may be integrated in one or more integrated circuits. The various components in the user device 500 may be coupled by one or more communication buses or signal lines.

Sensors, devices, and subsystems may be coupled to the peripherals interface 506 to facilitate multiple functionalities. For example, a motion sensor 510, a light sensor 512, and a proximity sensor 514 may be coupled to the peripherals interface 506 to facilitate orientation, lighting, and proximity functions. Other sensors 516 may also be connected to the peripherals interface or subsystem 506, such as a global navigation satellite system (GNSS) (e.g., GPS receiver), a temperature sensor, a biometric sensor, magnetometer, or other sensing device, to facilitate related functionalities. A camera subsystem 520 and an optical sensor 522, e.g., a charged coupled device (CCD) or a complementary metal-oxide semiconductor (CMOS) optical sensor, may be utilized to facilitate camera functions, such as recording photographs and video clips.

Communication functions may be facilitated through one or more wired and/or wireless communication subsystems 524, which can include radio frequency receivers and transmitters and/or optical (e.g., infrared) receivers and transmitters. For example, the Bluetooth (e.g., Bluetooth low energy (BTLE)) and/or Wi-Fi communications described herein may be handled by wireless communication subsystems 524. The specific design and implementation of the communication subsystems 524 may depend on the communication network(s) over which the user device 500 is intended to operate. For example, the user device 500 may include communication subsystems 524 designed to operate over a GSM network, a GPRS network, an EDGE network, a Wi-Fi or WiMax network, and a Bluetooth™ network. For example, the wireless communication subsystems 524 may include hosting protocols such that the device 500 can be configured as a base station for other wireless devices and/or to provide a Wi-Fi service.

An audio subsystem 526 may be coupled to a speaker 528 and a microphone 530 to facilitate voice-enabled functions, such as speaker recognition, voice replication, digital recording, and telephony functions. The audio subsystem 526 may be configured to facilitate processing voice commands, voiceprinting, and voice authentication, for example.

The I/O subsystem 540 may include a touch-surface controller 542 and/or other input controller(s) 544. The touch-surface controller 542 may be coupled to a touch surface 546. The touch surface 546 and touch-surface controller 542 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 546.

The other input controller(s) 544 may be coupled to other input/control devices 548, such as one or more buttons, rocker switches, thumb-wheel, infrared port, USB port, and/or a pointer device such as a stylus. The one or more buttons (not shown) may include an up/down button for volume control of the speaker 528 and/or the microphone 530.

In some implementations, a pressing of the button for a first duration may disengage a lock of the touch surface 546; and a pressing of the button for a second duration that is longer than the first duration may turn power to the user device 500 on or off. Pressing the button for a third duration may activate a voice control, or voice command, module that enables the user to speak commands into the microphone 530 to cause the device to execute the spoken command. The user may customize a functionality of one or more of the buttons. The touch surface 546 can, for example, also be used to implement virtual or soft buttons and/or a keyboard.

In some implementations, the user device 500 may present recorded audio and/or video files, such as MP3, AAC, and MPEG files. In some implementations, the user device 500 may include the functionality of an MP3 player, such as an iPod™. The user device 500 may, therefore, include a 36-pin connector and/or 8-pin connector that is compatible with the iPod. Other input/output and control devices may also be used.

The memory interface 502 may be coupled to memory 550. The memory 550 may include high-speed random access memory and/or non-volatile memory, such as one or more magnetic disk storage devices, one or more optical storage devices, and/or flash memory (e.g., NAND, NOR). The memory 550 may store an operating system 552, such as Darwin, RTXC, LINUX, UNIX, OS X, WINDOWS, or an embedded operating system such as VxWorks.

The operating system 552 may include instructions for handling basic system services and for performing hardware dependent tasks. In some implementations, the operating system 552 may be a kernel (e.g., UNIX kernel). In some implementations, the operating system 552 may include instructions for performing voice authentication.

The memory 550 may also store communication instructions 554 to facilitate communicating with one or more additional devices, one or more computers and/or one or more servers. The memory 550 may include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GNSS/Navigation instructions 568 to facilitate GNSS and navigation-related processes and instructions; and/or camera instructions 570 to facilitate camera-related processes and functions. In some implementations, the media processing instructions 566 may be divided into audio processing instructions and video processing instructions to facilitate audio processing-related processes and functions and video processing-related processes and functions, respectively.

The memory 550 may store app instructions and data 572 to implement various methods disclosed herein. For example, app instructions and data 572 may include instructions and data to implement the processing described above in the context of FIGS. 3 and 4. The memory 550 may also store other software instructions 574, such as for other apps or resource installed on the user device 500.

Each of the above identified instructions and applications may correspond to a set of instructions for performing one or more functions described herein. These instructions need not be implemented as separate software programs, procedures, or modules. The memory 550 may include additional instructions or fewer instructions. Furthermore, various functions of the user device 500 may be implemented in hardware and/or in software, including in one or more signal processing and/or application specific integrated circuits.

In some embodiments, processor 504 may perform processing including executing instructions stored in memory 550, and secure processor 505 may perform some processing in a secure environment that may be inaccessible to other components of user device 500. For example, secure processor 505 may include cryptographic algorithms on board, hardware encryption, and physical tamper proofing. Secure processor 505 may be manufactured in secure facilities. Secure processor 505 may encrypt data/challenges from external devices. Secure processor 505 may encrypt entire data packages that may be sent from user device 500 to the network. Secure processor 505 may separate a valid user/external device from a spoofed one, since a hacked or spoofed device may not have the private keys necessary to encrypt/decrypt, hash, or digitally sign data, as described herein.

Figure 6:
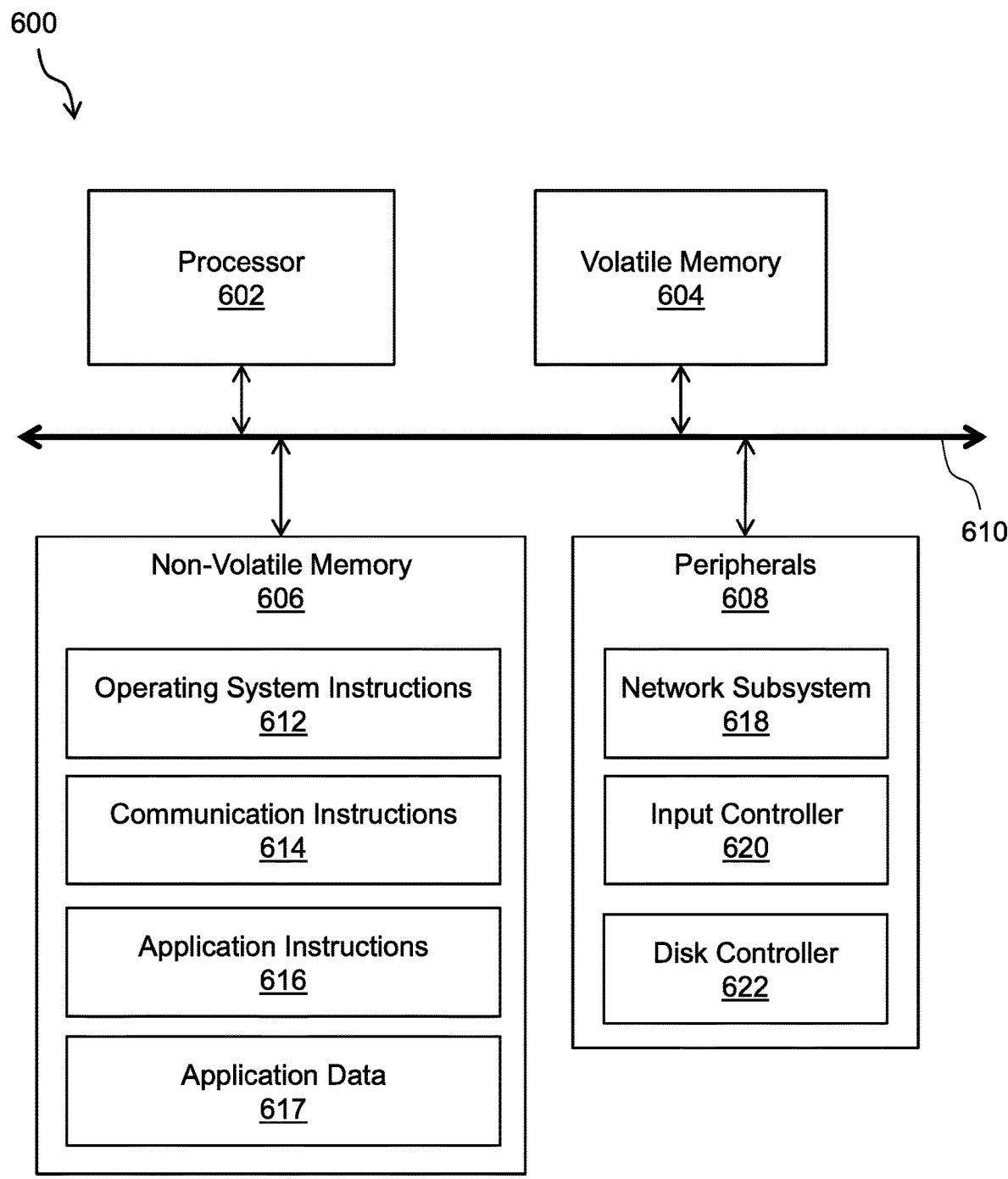
FIG. 6 is a block diagram of an illustrative server device, according to some embodiments of the present disclosure.

FIG. 6 shows an illustrative server device 600 that may implement various features and processes as described herein. The server device 600 may be implemented on any electronic device that runs software applications derived from compiled instructions, including without limitation personal computers, servers, smart phones, media players, electronic tablets, game consoles, email devices, etc. In some implementations, the server device 600 may include one or more processors 602, volatile memory 604, non-volatile memory 606, and one or more peripherals 608. These components may be interconnected by one or more computer buses 610.

Processor(s) 602 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 610 may be any known internal or external bus technology, including but not limited to ISA, EISA, PCI, PCI Express, NuBus, USB, Serial ATA or FireWire. Volatile memory 604 may include, for example, SDRAM. Processor 602 may receive instructions and data from a read-only memory or a random access memory or both. The essential elements of a computer may include a processor for executing instructions and one or more memories for storing instructions and data.

Non-volatile memory 606 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 606 may store various computer instructions including operating system instructions 612, communication instructions 614, application instructions 616, and application data 617. Operating system instructions 612 may include instructions for implementing an operating system (e.g., Mac OS®, Windows®, or Linux). The operating system may be multi-user, multiprocessing, multitasking, multithreading, real-time, and the like. Communication instructions 614 may include network communications instructions, for example, software for implementing communication protocols, such as TCP/IP, HTTP, Ethernet, telephony, etc. Application instructions 616 and data 617 can include instructions and data to implement various methods disclosed herein.

Peripherals 608 may be included within the server device 600 or operatively coupled to communicate with the sever device 600. Peripherals 608 may include, for example, network interfaces 618, input devices 620, and storage devices 622. Network interfaces may include for example an Ethernet or Wi-Fi adapter. Input devices 620 may be any known input device technology, including but not limited to a keyboard (including a virtual keyboard), mouse, track ball, and touch-sensitive pad or display. Storage devices 622 may include one or more mass storage devices for storing data files; such devices include magnetic disks, such as internal hard disks and removable disks; magneto-optical disks; and optical disks.

Methods described herein may represent processing that occurs within a wireless communications network (e.g., network 100 of FIG. 1) and/or a node thereof (e.g., user device 104 of FIG. 1). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method for efficient allocation of bandwidth in a wireless network, the method comprising:
   receiving, at a first user device, a request to share bandwidth with a second user device;
   in response to a user of the first user device approving the request to share the bandwidth with the second user device, establishing a peer-to-peer network between the first user device and the second user device, the peer-to-peer network associated with a first network interface of the first user device;
   receiving, via the first network interface of the first user device, first data packets transmitted by the second user device, the first data packets destined for a remote device; and
   transmitting, via a second network interface of the first user device, the first data packets to the remote device.

2. The method of claim 1 wherein the peer-to-peer network is a Bluetooth network.

3. The method of claim 1 wherein the peer-to-peer network is a Wi-Fi direct network.

4. The method of claim 1, further comprising:
   prompting the user of the first user device to select a percentage of the bandwidth to share with the second user device; and
   throttling the transmitting of the first data packets to a core network based on the selected percentage of the bandwidth to share.

5. The method of claim 1, further comprising:
   receiving, at the first user device, a second request to share the bandwidth with a third user device; and
   in response to determining the third user device is identified by a whitelist stored on the first user device, establishing a second wireless network connection between the first user device and the third user device.

6. The method of claim 1, further comprising:
   receiving, at the first user device, a second request to share the bandwidth with a third user device; and
   in response to determining the third user device is identified by a blacklist stored on the first user device, refusing the request to share the bandwidth with the third user device.

7. The method of claim 1, further comprising:
   sending a micropayment from the second user device to the first user device in exchange for sharing the bandwidth.

8. The method of claim 7, wherein an amount of the micropayment is based on an actual amount of the bandwidth shared between the first and second user devices.

9. The method of claim 1, wherein the second user device comprises a virtual network resource configured to encrypt the first data packets.

10. A system, comprising:
    a processor; and
    a memory having programming instructions stored thereon, which, when executed by the processor, performs one or more operations comprising:
       receiving a request to share bandwidth with a second user device;
       in response to a user approving the request to share the bandwidth with the second user device, establishing a peer-to-peer network with the second user device, the peer-to-peer network associated with a first network interface;
       receiving, via the first network interface, first data packets transmitted by the second user device, the first data packets destined for a remote device; and
       transmitting, via a second network interface, the first data packets to the remote device.

11. The system of claim 10, wherein the peer-to-peer network is a Bluetooth network.

12. The system of claim 10, wherein the peer-to-peer network is a Wi-Fi direct network.

13. The system of claim 10, wherein the one or more operations further comprise:
    prompting the user to select a percentage of the bandwidth to share with the second user device; and
    throttling the transmitting of the first data packets to a core network based on the selected percentage of the bandwidth to share.

14. The system of claim 10, wherein the one or more operations further comprise:

receiving a second request to share the bandwidth with a third user device; and in response to determining the third user device is identified by a whitelist stored on the system, establishing a second wireless network connection between the system and the third user device.

15. The system of claim 10, wherein the one or more operations further comprise:

receiving a second request to share the bandwidth with a third user device; and in response to determining the third user device is identified by a blacklist, refusing the request to share the bandwidth with the third user device.

16. The system of claim 10, wherein the one or more operations further comprise:

receiving a micropayment from the second user device in exchange for sharing the bandwidth.

17. The system of claim 16, wherein an amount of the micropayment is based on an actual amount of the bandwidth shared with the second user device.

18. The system of claim 10, wherein the second user device comprises a virtual network resource configured to encrypt the first data packets.

19. A non-transitory computer readable medium including one or more instructions which, when executed by one or more processors, cause the one or more processors to perform operations comprising:

receiving, at a first user device, a request to share bandwidth with a second user device;

in response to a user of the first user device approving the request to share the bandwidth with the second user device, establishing a peer-to-peer network between the first user device and the second user device, the peer-to-peer network associated with a first network interface of the first user device;

receiving, via the first network interface of the first user device, first data packets transmitted by the second user device, the first data packets destined for a remote device; and transmitting, via a second network interface of the first user device, the first data packets to the remote device.

20. The non-transitory computer readable medium of claim 19, wherein the peer-to-peer network is a Bluetooth network or a Wi-Fi direct network.

* * * * *